US008682322B2

(12) United States Patent
Wallis et al.

(10) Patent No.: US 8,682,322 B2
(45) Date of Patent: Mar. 25, 2014

(54) INTERNETWORKING FOR CIRCUIT SWITCHED FALLBACK

(75) Inventors: Michael Brett Wallis, McKinney, TX (US); Shravan Kumar Gaddam, Richardson, TX (US); Steve Corcoran, McKinney, TX (US)

(73) Assignee: Mavenir Systems, Inc., Richardson, TX (US)

( * ) Notice: Subject to any disclaimer, the term of this patent is extended or adjusted under 35 U.S.C. 154(b) by 49 days.

(21) Appl. No.: 13/480,792

(22) Filed: May 25, 2012

(65) Prior Publication Data

US 2012/0302234 A1 Nov. 29, 2012

Related U.S. Application Data

(60) Provisional application No. 61/490,543, filed on May 26, 2011.

(51) Int. Cl.
*H04W 4/00* (2009.01)
(52) U.S. Cl.
USPC .................... 455/435.1; 455/433; 455/435.2; 455/445

(58) Field of Classification Search
USPC .......... 455/414.1, 414.2, 412.1, 412.2, 432.1, 455/432.3, 433, 435.1, 435.2, 435.3, 445
See application file for complete search history.

(56) References Cited

U.S. PATENT DOCUMENTS

| | | | |
|---|---|---|---|
| 2005/0075106 A1* | 4/2005 | Jiang | 455/432.3 |
| 2011/0021216 A1* | 1/2011 | Pudney et al. | 455/466 |
| 2011/0211527 A1* | 9/2011 | Agarwal et al. | 370/328 |
| 2012/0087340 A1* | 4/2012 | Yang et al. | 370/331 |
| 2012/0190351 A1* | 7/2012 | Tian et al. | 455/417 |
| 2012/0218889 A1* | 8/2012 | Watfa et al. | 370/230 |

* cited by examiner

*Primary Examiner* — Jean Gelin
(74) *Attorney, Agent, or Firm* — Andrews Kurth LLP

(57) ABSTRACT

In some implementations, a method includes presenting a network node as a Visited Location Resource (VLR) for User Equipment (UE) to Mobile Management Entity (MME) in a Long Term Evolution (LTE) system. The network node includes an SGs interface to the MME in the LTE system and a MAP interface to a Mobile Switching Center (MSC) in a Cellular System (CS). A notification of the UE registering the LTE system is received from the MME. A network node registers, through the MAP interface, with a Home Location Resource (HLR) in the CS as the VLR for the UE.

17 Claims, 15 Drawing Sheets

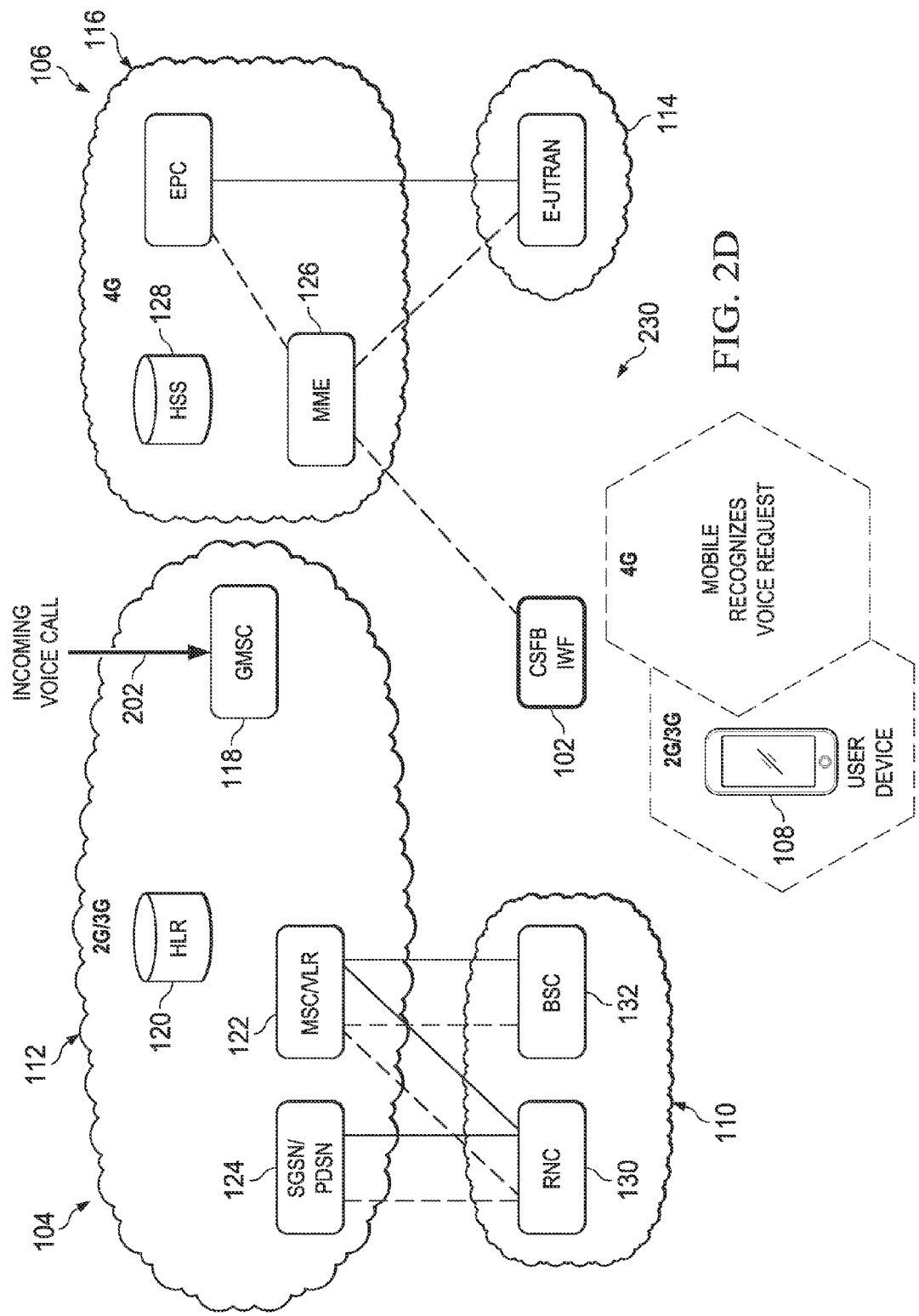

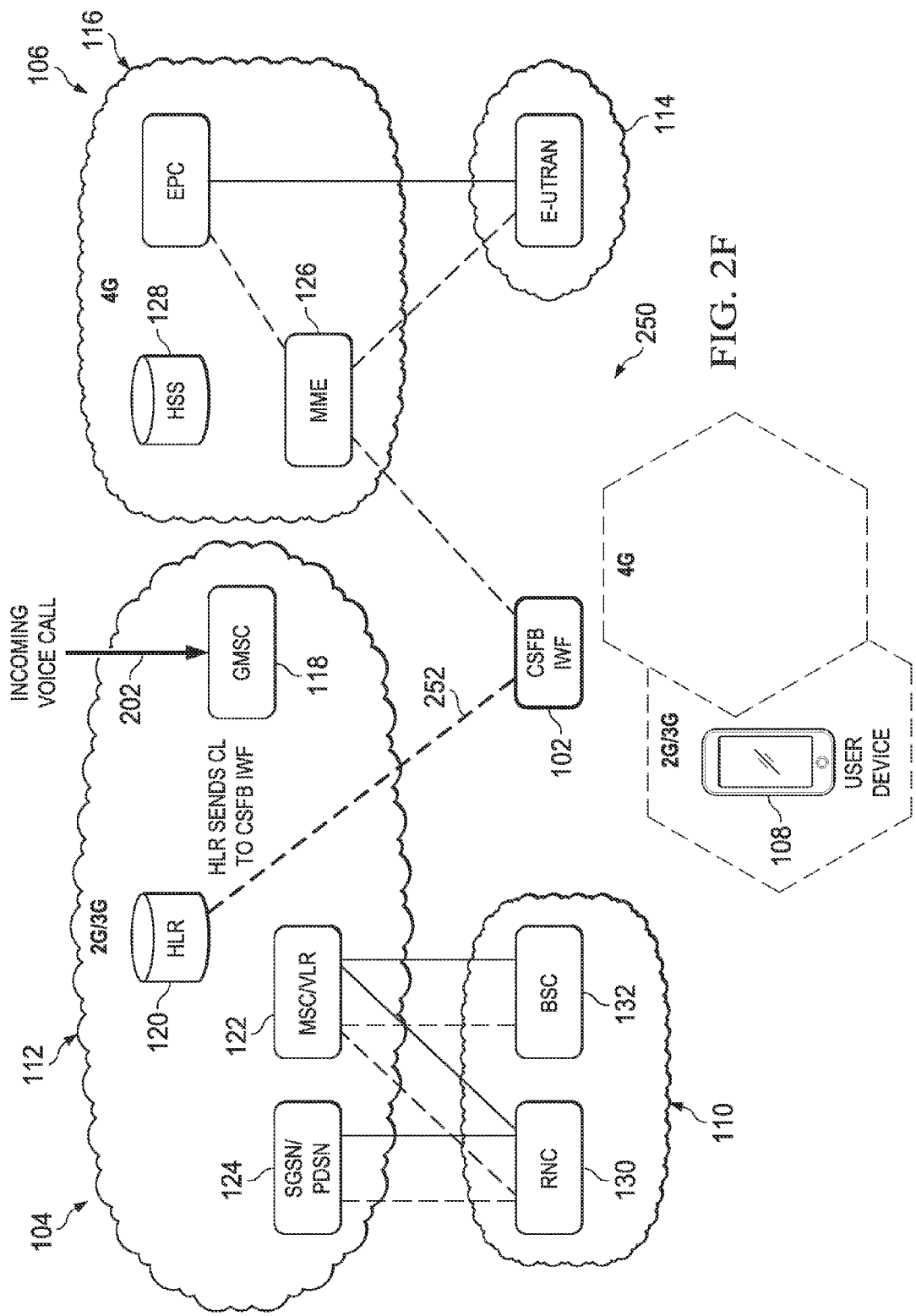

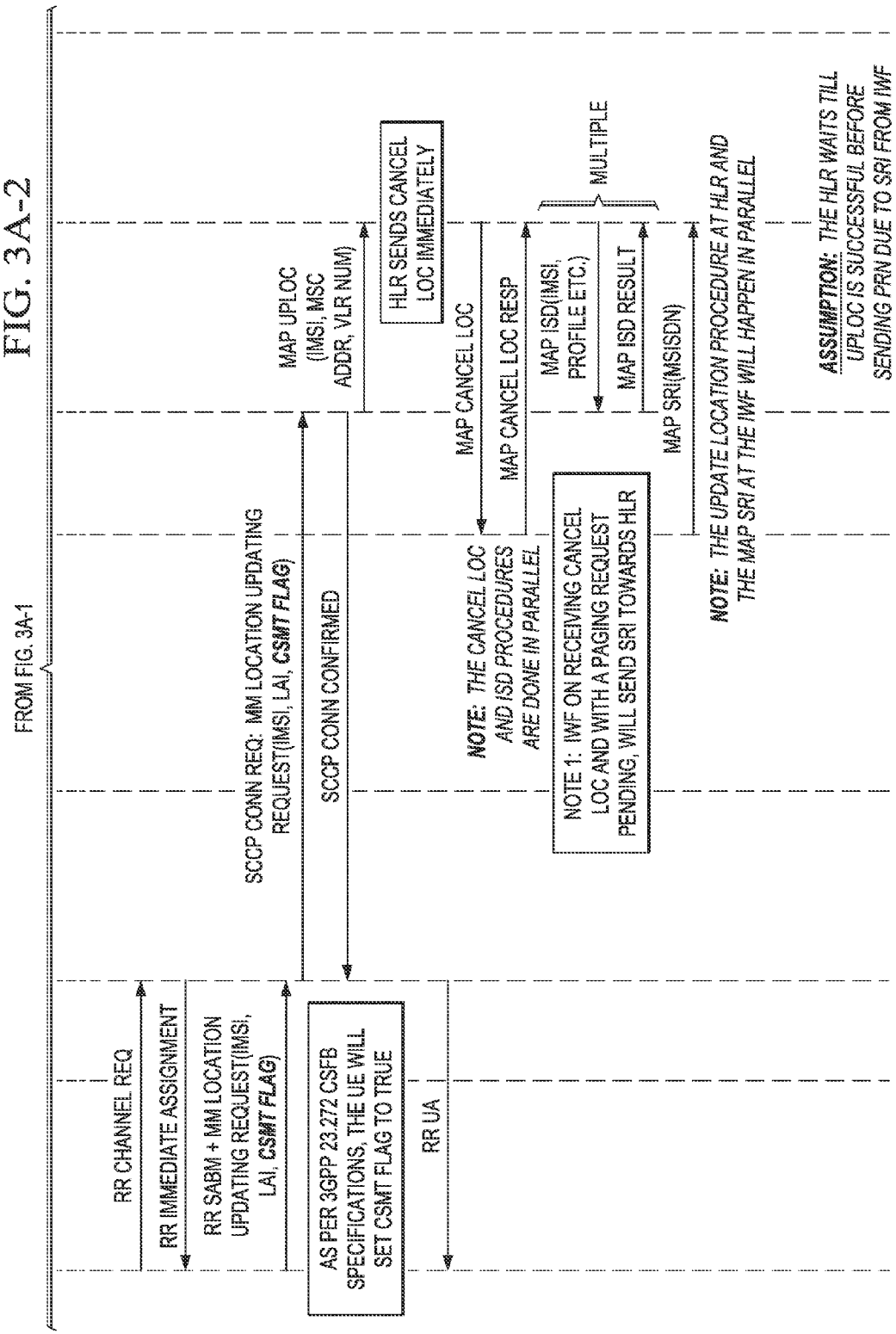

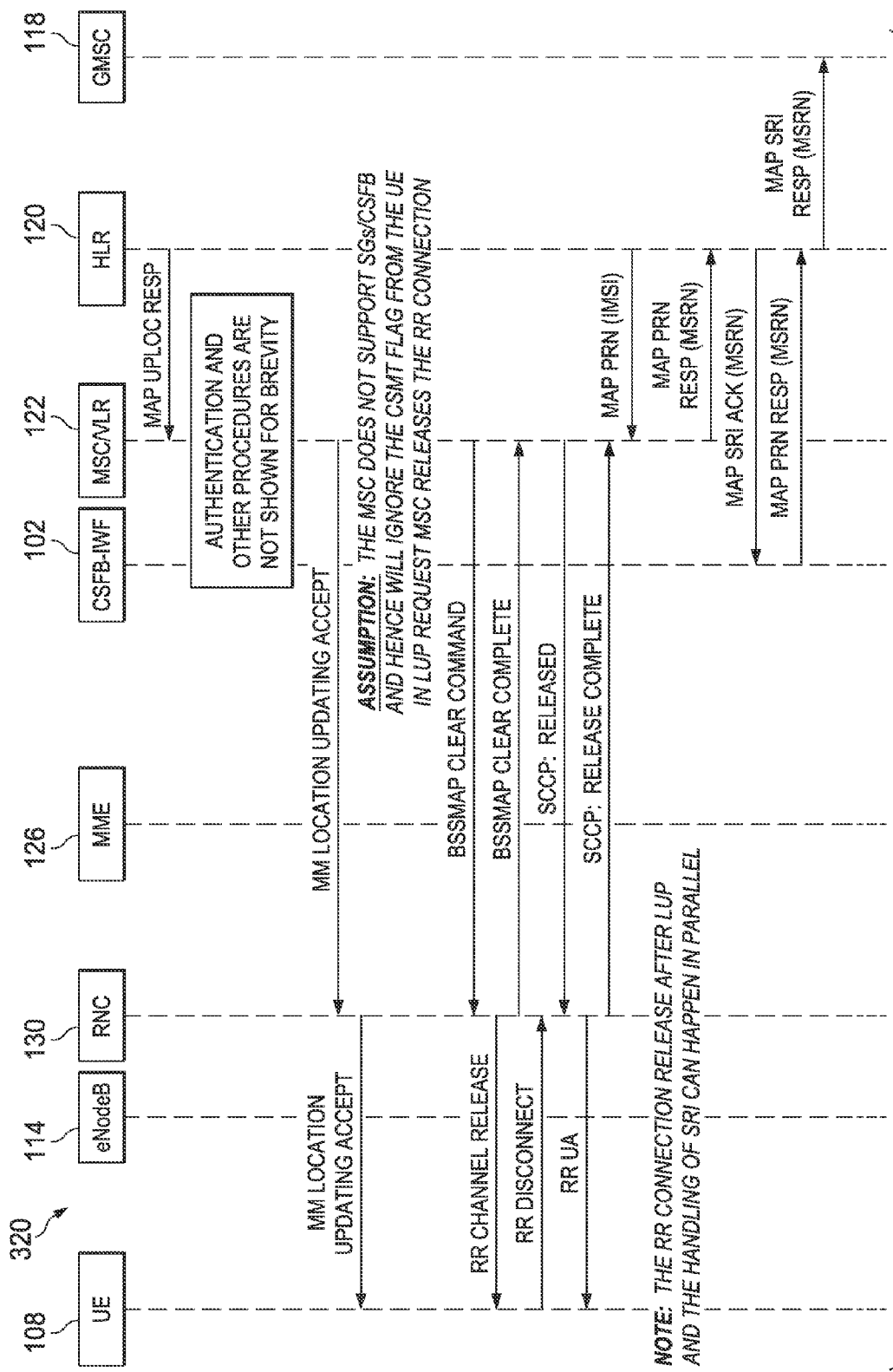

US 8,682,322 B2

INTERNETWORKING FOR CIRCUIT SWITCHED FALLBACK

CLAIM OF PRIORITY

This application claims priority under 35 USC §119(e) to U.S. Patent Application Ser. No. 61/490,543, filed on May 26, 2011, the entire contents of which are hereby incorporated by reference.

TECHNICAL FIELD

This invention relates to network communications and, more particularly, to internetworking for circuit switched fallback.

BACKGROUND

Currently, Long Term Evolution (LTE) systems do not support voice calls, so Circuit Switch Fall Back (CSFB) is executed for these calls. For example, the network is enhanced to page the mobile over the LTE radio, and when a mobile camped on LTE radio receives a voice call page request over the LTE system, the mobile device falls back to the CS radio to receive voice call. In connection with CSFB, any active data session is suspended or handed over to 2G/3G PS access. For Mobile Originating (MO) calls, the mobiles camped on LTE radio initiate fallback on their own to originate a voice call in the CS domain. Mobiles camped on LTE radio can send and receive SMS without falling back. The basic idea is to force the UE to fallback to CS radio for voice calls, which is not VoLTE. In order to execute the CSFB, a new interface (SGs) is required between MME and MSC/VLR to allow the MSC to know when a UE is EPC attached. The MSC/VLR registers with the HLR as normal, so that Mobile Terminating (MT) voice calls and SMS are routed there. In these cases, MO/MT SMS are delivered over LTE access and EPC via the MSC. For MO calls, the UE falls back to CS radio before originating the call so no core network changes are required. For MT calls, the call is delivered to the MSC as normal, and the MSC pages the UE via new SGs between the MME and the MSC. The UE falls back to CS radio and issues either a Location Update or Page Response. The MSC completes the call. If the UE falls back to a MSC different than the one that issued the SGs page, complex "roaming retry" procedures are required to complete the call. That said, this process requires new interfaces and modification of existing nodes in each of the LTE and CS systems. As for new interfaces, a new SGs interface is required between the MSC in the CS core network and the MME in the EPC. The SGs enables the MSC to learn of EPC attachment, MO/MT SMS during EPC attachment, and MSC to page the subscriber over EPC and LTE access for voice calls. As for the modified nodes, the MSC requires SGs interface and associated state machine. The MME requires an SGs interface and modification of the associated state machine and requires S3 interface to SGSN if ISR (Idle mode Signaling Reduction) is enabled. The MSC/HLR/GMSC all require changes in order to support Roaming Retry, which is made more likely by CSFB.

SUMMARY

In some implementations, a method includes presenting a network node as a Visited Location Resource (VLR) for User Equipment (UE) to Mobile Management Entity (MME) in a Long Term Evolution (LTE) system. The network node includes an SGs interface to the MME in the LTE system and a MAP interface to a Mobile Switching Center (MSC) in a Cellular System (CS). A notification of the UE registering the LTE system is received from the MME. A network node registers, through the MAP interface, with a Home Location Resource (HLR) in the CS as the VLR for the UE.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 2A-2I are communication systems illustrating signaling during circuit switched fallback;

Like reference symbols in the various drawings indicate like elements.

DETAILED DESCRIPTION

Figure 1:
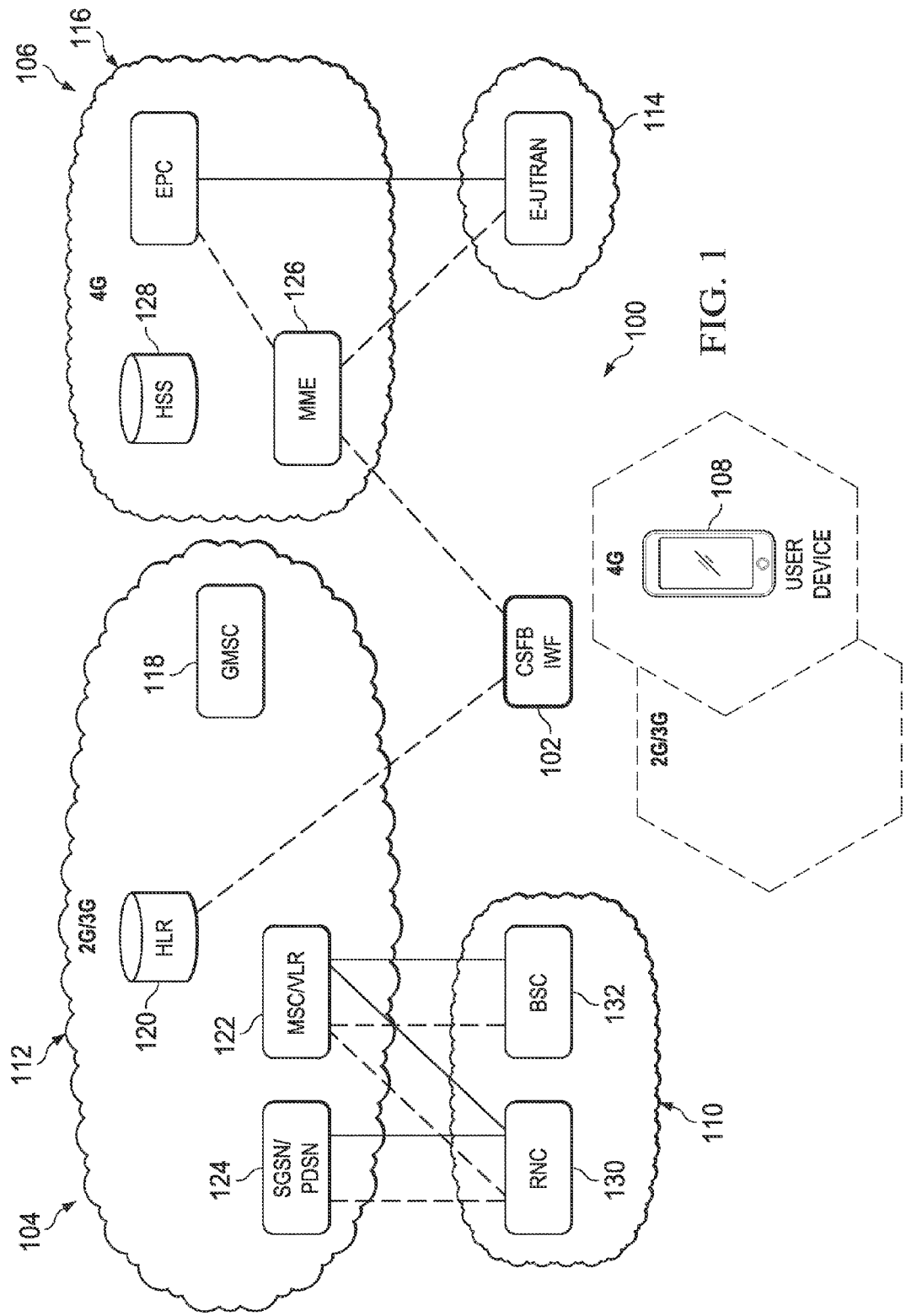
FIG. 1 is a communication system for circuit switched fallback.

FIG. 1 is an example communication system 100 for switching User Equipment (UE) from a Long Term Evolution (LTE) system to a Circuit Switched (CS) system when receiving a voice call. For example, when the UE is camped on an LTE system and receives an indication of a mobile terminating voice call from the CS domain, the UE may switch to a CS network (2G or 3G) to accept the call. In general, switching from the LTE network to the CS network for voice calls is referred to as Circuit Switched Fall Back (CSFB). In some implementations, the system 100 may execute CSFB independent or without including an SGs interface on a Mobile Switching Center (MSC). In addition, the system 100 may execute the CSFB independent or without modifying the existing MSC. For example, the system 100 may include a CSFB Internetworking Function (IWF) 102 (discussed in more detail below) that connects to a CS network through MAP interfaces and connects to an LTE network through an SGs interface. In doing so, the system 100 may eliminate, reduce or otherwise prevent the following: changes at the MSC (e.g., no SGs interfaces at the MSC, no configuration changes); roaming retry (e.g., saves on complex MSC/HLR functionality, reduces call setup delay); TA to LA mapping (e.g., all TAs may be mapped to a single LA, owned by the CSFB IWF); processing the MT call bearer (e.g., no bearer trunks, reduce cost); and/or others.

At a high level, the system 100, in some implementations, includes the CSFB IWF 102 communicably coupled to a CS system 104, an LTE system 106, and UE 108 through the networks 104 and 106. The CS system 104 includes a radio access network (RAN) 110 and a cellular core network 112, and the LTE system 106 includes an LTE Radio Access Network 114 such as evolved UTRAN (E-UTRAN 114) and a core network 116 called an Evolved Packet Core (EPC) 116. The cellular core network 112 includes the GMSC 118, the HLR 120, the MSC/VLR 122, and the SGSN 124. The EPC 116 includes the MME 126 and the Home Subscriber Server (HSS) 128. As for a high level description, the CSFB IWF 102 registers with the serving MSC/VLR when the UE performs an IMSI attach over EPC 116. After registration, the GMSC 118 may receive an incoming request to terminate a voice call with the UE 118 and transmit a request for routing information to the HLR 120. After determining that the CSFB IWF 102 is presented as the serving MSC to the cellular core network 112, the HLR 120 may transmit a request for the MSRN to the CSFB IWF 102. In connection with storing information identified with the request, the CSFB IWF 102 transmits a request to the UE 108 through the MME 126 of the EPC 116 to fall back to the cellular system 104. The UE 108 may transmit a request to the MSC/VLR 122 through the RAN 110 to update its location, which is relayed to the HLR 120. The HLR 120 re-assigns the MSC/VLR 122 as the serving MSC and transmits a CL request to the CSFB IWF 102. The CSFB IWF 102 sends a new request for routing information to the HLR 120 and transmits the received MSRN in the PRN Ack to the GMSC 118, which uses this MSRN to route the call to the MSC/VLR 122 where it is completed.

Turning to more detailed description of the system 110, the CSFB IWF 102 can include any software, hardware, and/or firmware operable to transfer a UE 108 from the LTE system 106 to the CS system 104 in connection with receiving a mobile terminating request for a voice call from the cellular core network 112. For example, the CSFB IWF 102 may page the UE 108 to request an update location request with the HLR 120 in the cellular core network 112. By updating the location in the cellular system 104, the CSFB IWF 102 may reply to the PRN request using the MSRN that the cellular system 104 assigns during the location update. In initiating the updated location, the CSFB IWF 102 may initiate the UE 108 to fallback to CS radio for voice calls, which is not Voice over LTE (VoLTE). In some implementations, the CSFB IWF 102 can include a new interface (SGs) to MME 126, which may allow the CSFB IWF 102, when operating as the MSC/VLR, to determine when a UE 108 is attached to the EPC 116. The CSFB IWF 102 may include interfaces such as SGs to MME 126, MAP to HLR 120, MAP to SMSC, and/or others. As for the SGs to MME 126, the CSFB IWF 102 may execute standard SGs functionality, and/or the MME 126 may identify the CSFB IWF 102 as a Visitor Location Register (VLR). In other words, the CSFB IWF 102 may support the SGs interface from the MME 126 in the EPC domain. In these instances, the CSFB IWF 102 may appear as a VLR to the MME 126. The CSFB IWF 102 acting as VLR/MSC for the subscribers in EPC domain may interact with the HLR 120 over a MAP interface and also with an SMSC in the network 112 for SMS related procedures. The CSFB IWF 102 may contain a "VLR" that maintains the SGs states and state machine defined in 3GPP TS 29.118. As for the MAP to HLR 120, the CSFB IWF 102 may execute location updating procedures and/or call routing procedures using this interface. The MAP interface between the CSFB IWF 102 and HLR 1020 may be used for location management, subscriber management and/or call handling procedures. As for the MAP to SMSC, the CSFB IWF 102 may execute MO/MT SMS procedures using MAP MO Forward Short Message and/or MAP MT Forward Short Message. For example, the MAP interface between CSFB IWF 102 and an SMSC may be used for mobile originated and/or mobile terminated SMS. In some implementations, the CSFB IWF 102 may operate independent or without bearer facilities (e.g., TDM trunks). The CSFB IWF 102 may execute one or more of the following: receive the MT call signaling from the HLR 120, as it appears as the serving MSC/VLR; sends SGs Paging Request to trigger CSFB; initiate MT call signaling to redirect the call to the new (and real) serving MSC/VLR; and/or other functions. In connection with these processes, the UE 108 may fall back to the CS domain and may perform a Location Update MSC/VLR 122. In addition, the UE 108 may accept the call once the CSFB IWF 102 redirects it. As previously mentioned, the CSFB IWF 102 may, in some implementations, emulate or otherwise represent itself as an element of core network 112. For example, the CSFB IWF 102 may emulate or otherwise represent itself as an MSC, a VLR, or other element of the cellular core network 112. In the case that communication node 108 emulates an MSC, the CSFB IWF 102 may be queried by the HLR 120 in the cellular core network 112 like any other MSC.

Turning to a detailed description of other elements in the system 100, the LTE system 106 can includes the EPC 116 and the E-UTRAN 114. The EPC 116 provides connectivity to an external network such as the cellular core network 112. The E-UTRAN 114 includes one or more base stations such as eNode-B (eNB) base stations that provide wireless service(s) to UE 108. An EPC-based core network can include a Serving Gateway (SGW), the MME 126, and a Packet Gateway (PGW). An SGW can route traffic within the EPC 116. The MME 155 is responsible for core-network mobility control, attachment of the UE 108 to the core network and for maintaining contact with idle mode UEs. The PGW is responsible for enabling the ingress/egress of traffic from/to the Internet. The PGW can allocate IP addresses to the UEs 108.

An LTE-based wireless communication system has network interfaces defined between system elements. The network interfaces include the Uu interface defined between a UE and an eNB, the S1U user-plane interface defined between an eNB and an SGW, the S1C control-plane interface defined between an eNB and an MME (also known as S1-MME), and the S5/S8 interface defined between an SGW and a PGW. Note that the combination of S1U and S1C is often simplified to "S1".

MME 126 is a control-node for the LTE access network. The MME 126 is responsible for UE 108 tracking and paging procedures including retransmissions. MME 126 handles the bearer activation/deactivation process and is also responsible for choosing the SGW for a UE 108 at the initial attach and at the time of an intra-LTE handover. The MME 126 also authenticates the user by interacting with the HSS 124. The MME 126 also generates and allocates temporary identities to UEs and terminates Non-Access Stratum (NAS) signaling. The MME 126 checks the authorization of the UE 108 to camp on the service provider's Public Land Mobile Network (PLMN) and enforces UE roaming restrictions. The MME 126 is the termination point in the network for ciphering/integrity protection for NAS signaling and handles the security key management. Lawful interception of signaling is also supported by the MME 126. The MME also provides the control plane function for mobility between LTE and 2G/3G access networks with the S3 interface terminating at the MME 126 from the SGSN 130. The MME 126 also terminates the S6a interface towards the home HSS 128 for roaming UEs.

The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the down link data path and triggers paging when down link data arrives for the UE 108. The SGW manages and stores UE contexts, e.g., parameters of the IP bearer service and network internal routing information. The SGW also performs replication of the user traffic in case of lawful interception. The PGW provides connectivity to the UE 108 to external packet data networks by being the point of exit and entry of traffic for the UE 108. A UE 108 may have simultaneous connectivity with more than one PGW for accessing multiple packet data networks. The P-GW performs policy enforcement, packet filtering for each user, charging support, lawful interception, and packet screening. The PGW also provides an anchor for mobility between 3GPP and non-3GPP technologies such as WiMAX and 3GPP2 (CDMA 1X and EvDO). The SGW or the PGW depending on the embodiment, can be used to provide deep packet inspection and provide advertising to the user on a per subscriber basis as described above on a chassis implementing a SGW or a PGW.

The cellular core system 104 typically includes various switching elements, gateways and service control functions for providing cellular services. The cellular core system 104 often provides these services via a number of cellular access networks (e.g., RAN) and also interfaces the cellular system with other communication systems such as EPC 116. In accordance with the cellular standards, the cellular core system 104 may include a circuit switched (or voice switching) portion for processing voice calls and a packet switched (or data switching) portion for supporting data transfers such as, for example, e-mail messages and web browsing. The circuit switched portion includes MSC/VLR 122 that switches or connects telephone calls between cellular access system 106 and PSTN 104 or another network, between cellular networks or others. The MSC/VLR 122 may support only a single media stream (e.g., single TDM channel for the standard A-interface, single RTP stream for AoIP) towards the RAN 110. This single media stream may be used for supplementary services which involve multiple calls to/from the mobile such as call waiting. In other words, multiple calls to/from a GSM mobile share a single media connection on the MSC's access interface.

The cellular core system 104a may also include the HLR 120 for maintaining "permanent" subscriber data and a VLR (and/or an SGSN) for "temporarily" maintaining subscriber data retrieved from the HLR 120 and up-to-date information on the location of those UE 108 using a wireless communications method. In addition, the cellular core system 104 may include Authentication, Authorization, and Accounting (AAA) that performs the role of authenticating, authorizing, and accounting for UE 108 operable to access cellular core system 104. While the description of the core system 104 is described with respect to GSM networks, the core system 104 may include other cellular radio technologies such as UMTS, CDMA, and others without departing from the scope of this disclosure.

RAN 110 provides a radio interface between mobile device 102a and the cellular core system 104a which may provide real-time voice, data, and multimedia services (e.g., a call) to UE 108. In general, RAN 110 communicates air frames via radio frequency (RF) links. In particular, RAN 110 converts between air frames to physical link based messages for transmission through the cellular core system 104a. RAN 110 may implement, for example, one of the following wireless interface standards during transmission: GSM access, UMTS access, Code Division Multiple Access (CDMA), Time Division Multiple Access (TDMA), General Packet Radio Service (GPRS), Enhanced Data Rates for Global Evolution (EDGE), or proprietary radio interfaces. Users may subscribe to RAN 110, for example, to receive cellular telephone service, Global Positioning System (GPS) service, XM radio service, etc.

RAN 110 may include Base Stations (BS) connected to Base Station Controllers (BSC) 132. BS receives and transmits air frames within a geographic region of RAN 110 (i.e., transmitted by UE 108) and communicates with other UE connected to the cellular core system 104. Each BSC 132 is associated with one or more BS 114 and controls the associated BS 114. For example, BSC 132 may provide functions such as handover, cell configuration data, control of RF power levels or any other suitable functions for managing radio resource and routing signals to and from BS. MSC/VLR 122 may be connected to BSC 132 through a standard interface such as the A-interface. While the elements of RAN 110 are describe with respect to GSM networks, the RAN 110 may include other cellular technologies such as UMTS, CDMA, and/or others. In the case of UMTS, the RAN 110 may include Node B and Radio Network Controllers (RNC).

Turning to a more detailed description of the elements, the UE 108 comprises an electronic device operable to receive and transmit wireless communication with system 100. As used in this disclosure, the UE 108 is intended to encompass cellular phones, data phones, pagers, portable computers, SIP phones, smart phones, personal data assistants (PDAs), one or more processors within these or other devices, or any other suitable processing devices capable of communicating information using cellular radio technology. In the illustrated implementation, the UE 108 is able to transmit in one or more cellular band. In these cases, messages transmitted and/or received by the UE 108 may be based on a cellular radio technology. There may be any number of the UEs 108 communicably coupled to cellular access network 110. Generally, the UE 108 may transmit voice, video, multimedia, text, web content or any other user/client-specific content. In short, the UE 108 generates requests, responses or otherwise communicates with mobile core system 104a through RAN 110 or the EPC 116 through the E-UTRAN 114.

In some aspects of operation, the system 100 may execute one or more of the following: receiving a Provide Roaming Number (PRN) request from a Home Location Register (HLR) in the CS network for a Mobile Station Roaming Number (MSRN) in connection with mobile terminating call request; transmit a request to the UE through the Mobility Management Entity (MME) in the LTE system to fall back to the CS system; receive a Cancel Location (CL) request from the HLR in connection with the location of the UE being reassigned to a different MSC; in response to at least the CL request, transmit a Send Routing Information (SRI) request to the HLR; receive the MSRN from the MSC through the HLR; using the received MSRN, transmit a PRN Acknowledgement (PRN Ack) to the HLR such that the call terminates with the UE using the MSRN; and/or others.

Figure 2A:
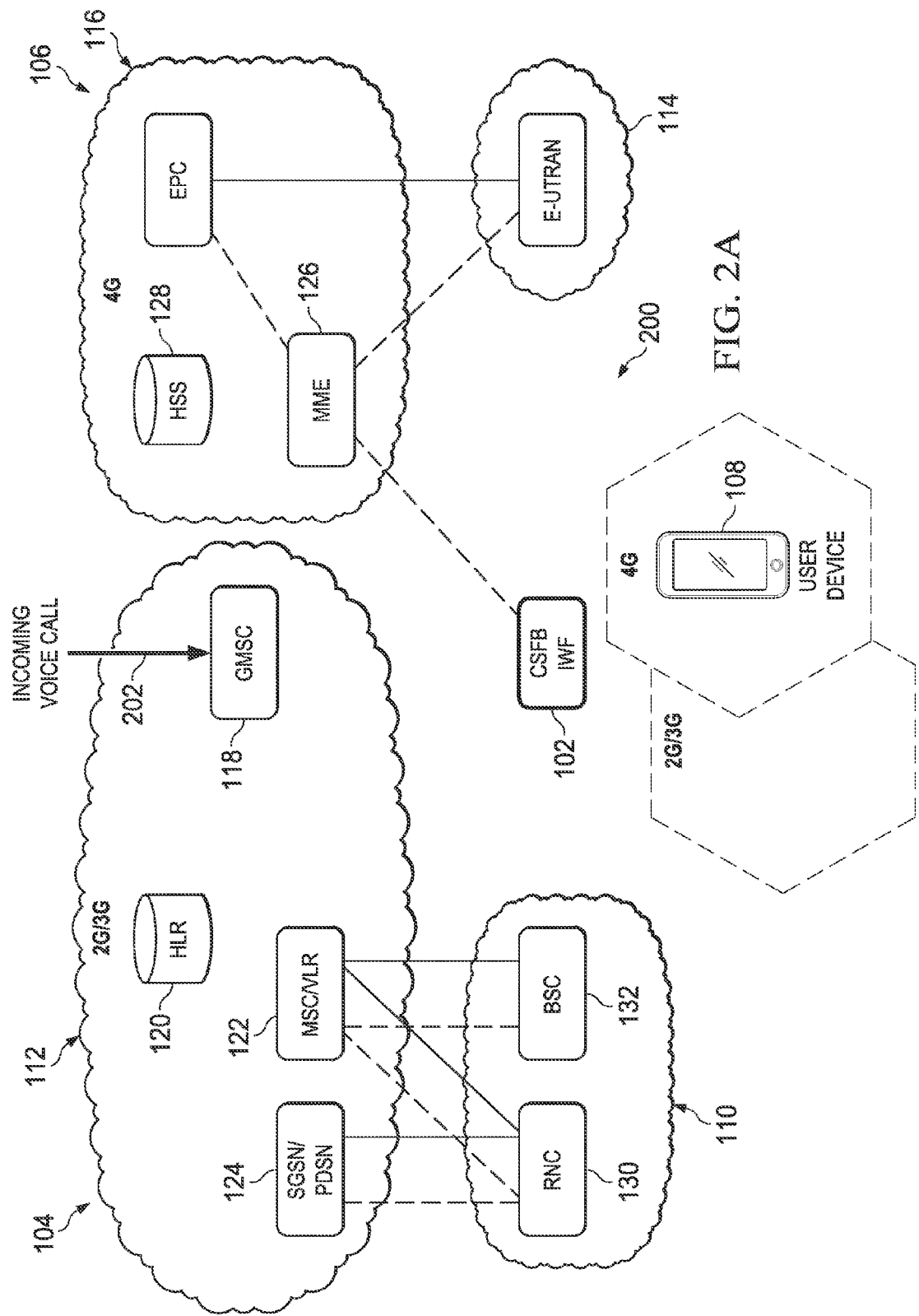
Figure 2B:
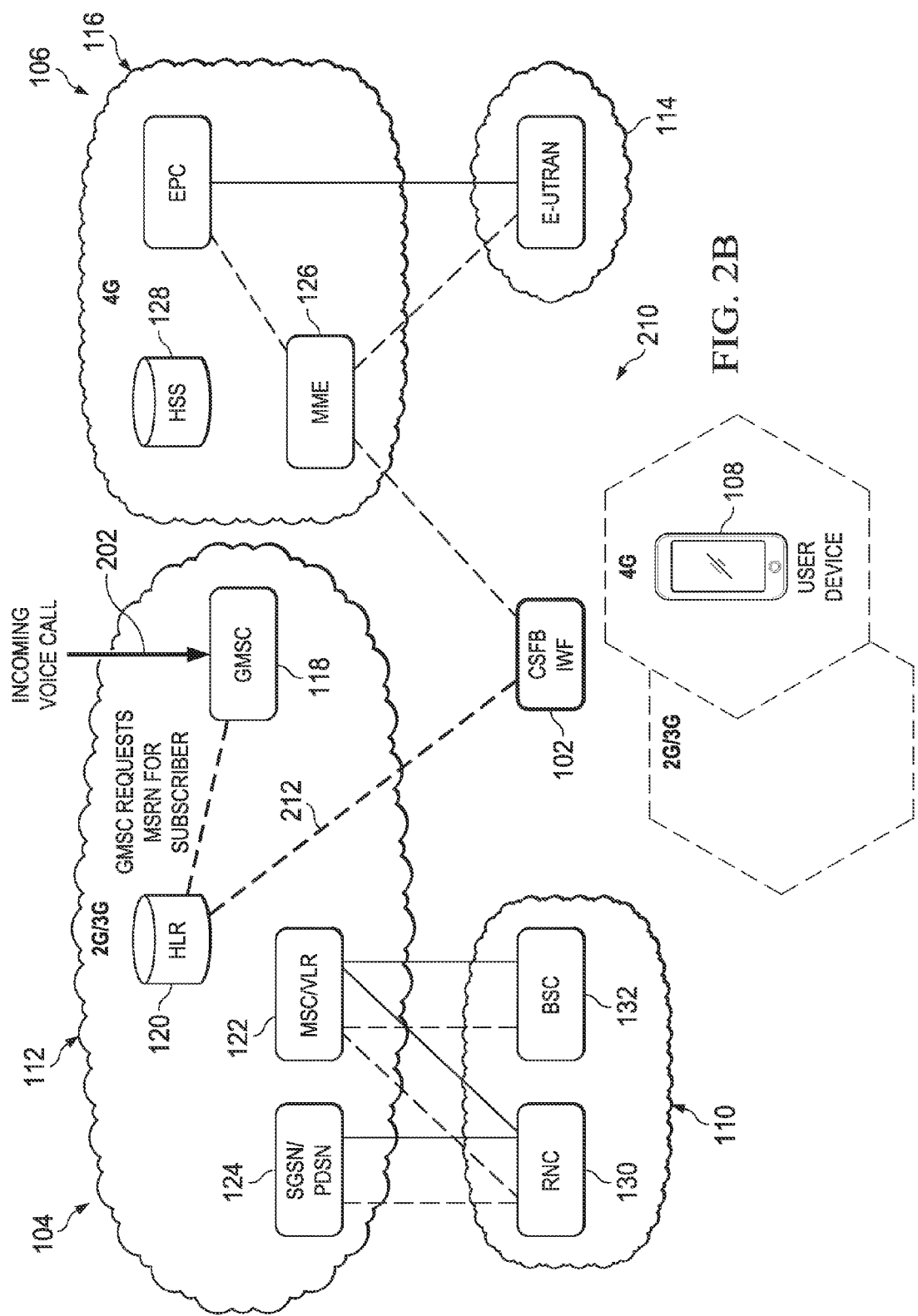
Figure 2C:
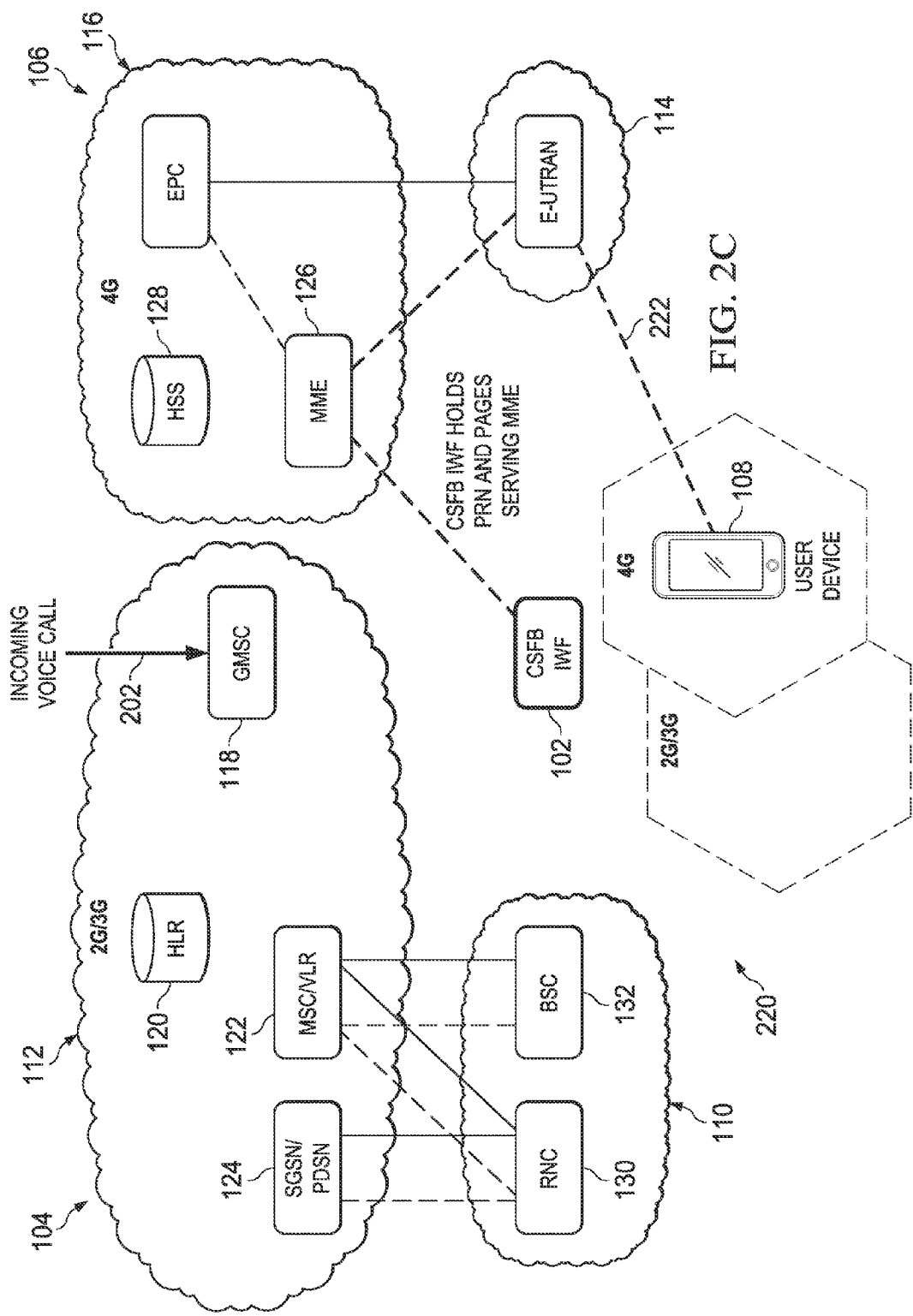
Figure 2E:
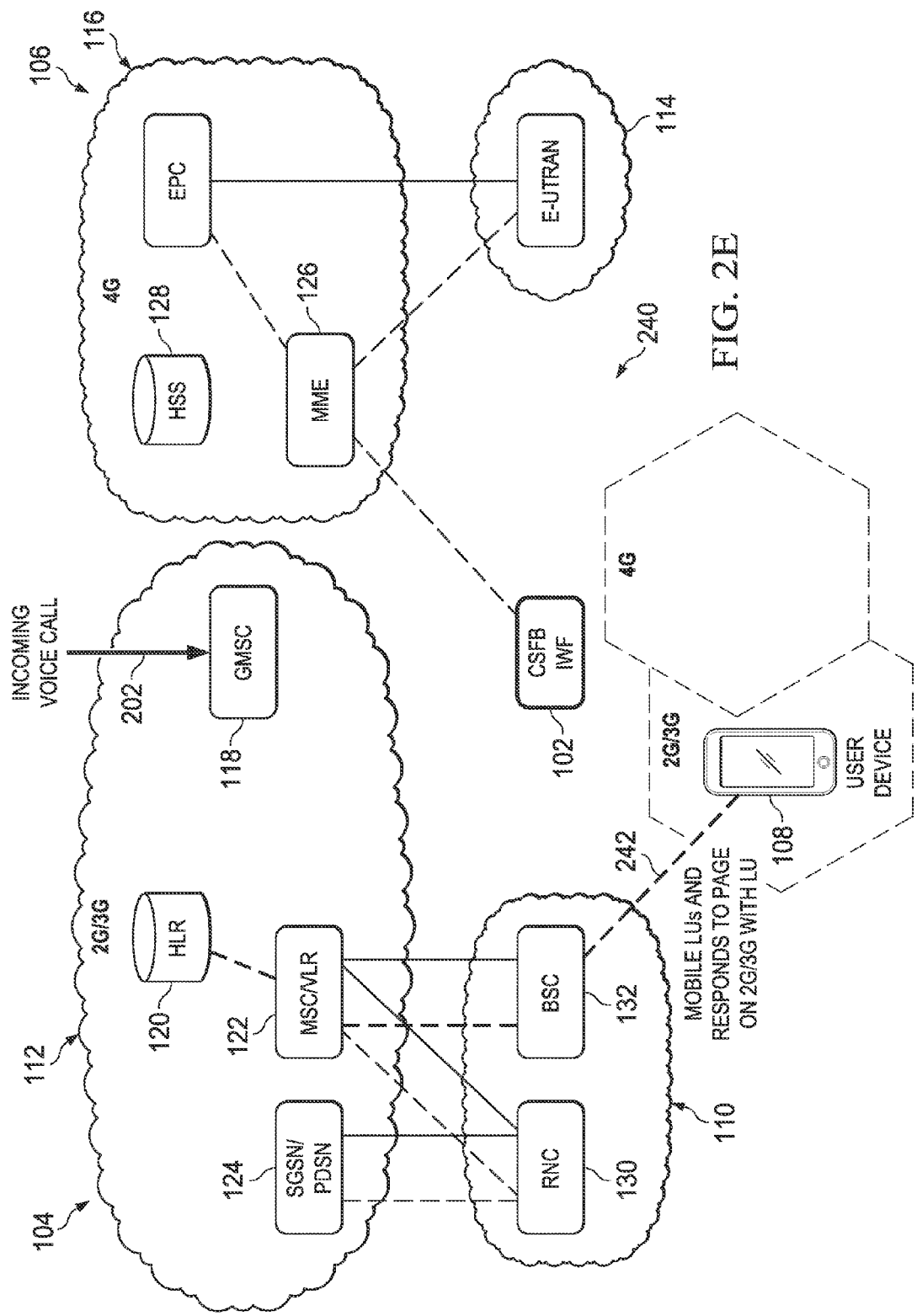
Figure 2G:
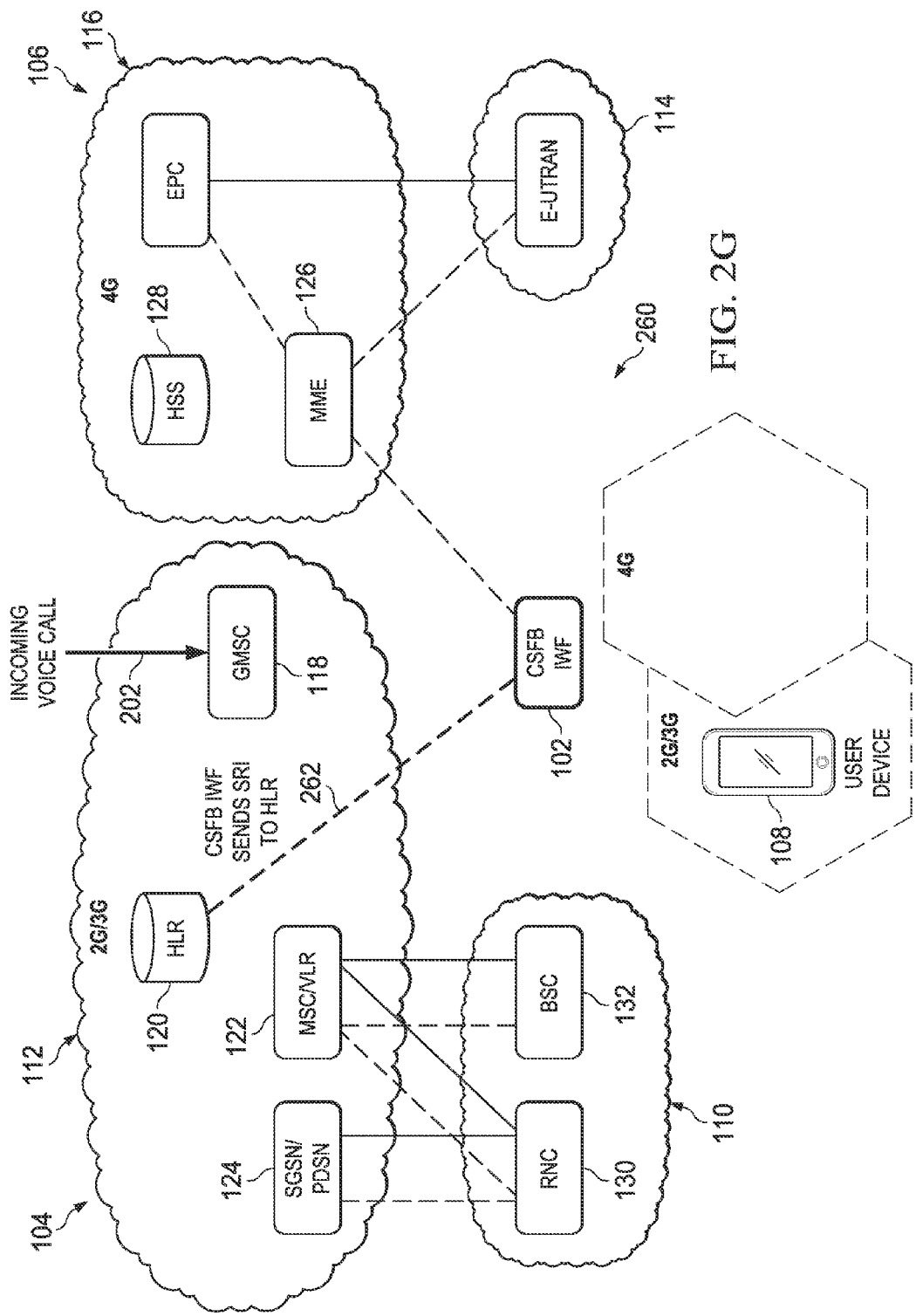
Figure 2H:
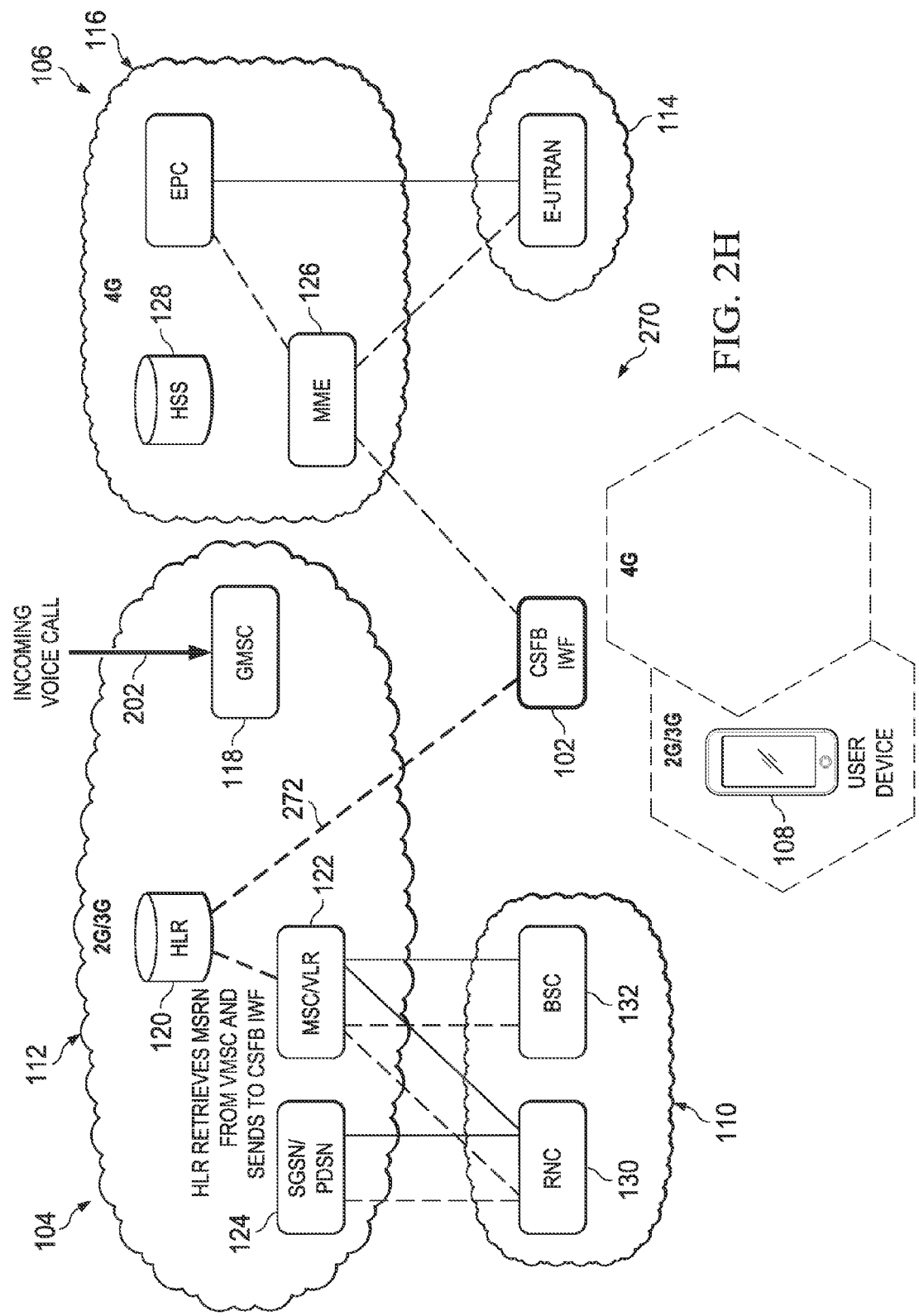
Figure 2I:
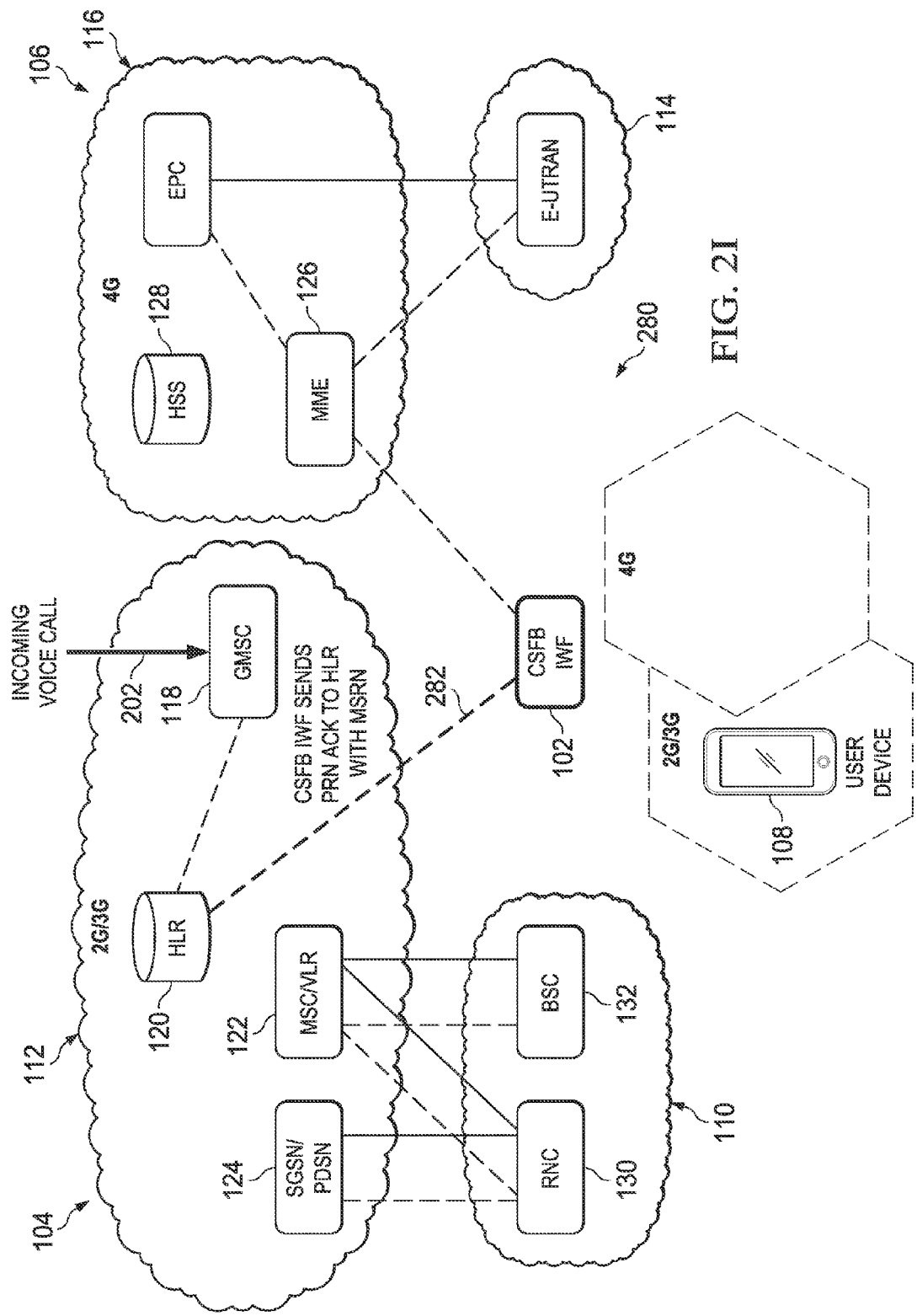

FIGS. 2A-2I are systems 200-280 illustrating signaling for executing CSFB in accordance with some implementations of the present disclosure. Referring to FIG. 2A, the GMSC 118 receives the signal 202 indicating a request to terminate a voice call with the UE 108. Referring to FIG. 2B, the system 210 illustrates the signal 212 requesting the MSRN for the UE 108. In particular, the GMSC 118 transmits a Provide Roaming Number (PRN) request to the HLR 120, and the HLR 120 transmits the PRN request to CSFB IWF 102 as the MSC/VLR for the UE 108. Referring to FIG. 2C, the system 220 illustrates a signal 222 illustrating a page requesting the UE 108 to update its location with the HLR 120. In particular, the CSFB IWF 102 transmits the page to the MME 126, which, in turn, transmits the page to the UE 108 through the E-UTRAN 114. Referring to FIG. 2D, the system 230 illustrates the UE 108 retuning communication form the E-UTRAN 114 to the RAN 110. Referring to FIG. 2E, the system 240 illustrates the signal 242 requesting a location update from the cellular core network 112. In particular, the UE 108 transmits an update request to the HLR 120 through the BSC 132 and the MSC/VLR 122. Referring to FIG. 2F, the system 250 illustrates a signal 252 indicating that the UE 108 is registered with a different MSC. In particular, the HLR 120 updates registration of the UE 108 with the MSC/VLR 122 and transmits a Cancel Location (CL) request to the CSFB IWF 102. Referring to FIG. 2G, the system 260 illustrates the signal 262 requesting the current MSRN from the HLR 20. In particular, the CSFB IWF 102 transmits a SRI request to the HLR 120 using the MSISDN identified in the previously PRN request received from the GMSC 118 via the HLR 120. Referring to FIG. 2H, the system 270 illustrates the signal 272 for retrieving MSRN and transmitting the MSRN to the CSFB IWF 102. In particular, the HLR 120 identifies the MSC/VLR 122 as the VMSC and retrieves the current MSRN from the MSC/VLR 122. Referring to FIG. 2I, the system 280 illustrates signal 282 transmitting the current MSRN to the GMSC 118 via HLR 120 to complete the mobile terminating call with the UE 108.

Figures 1, 3A:
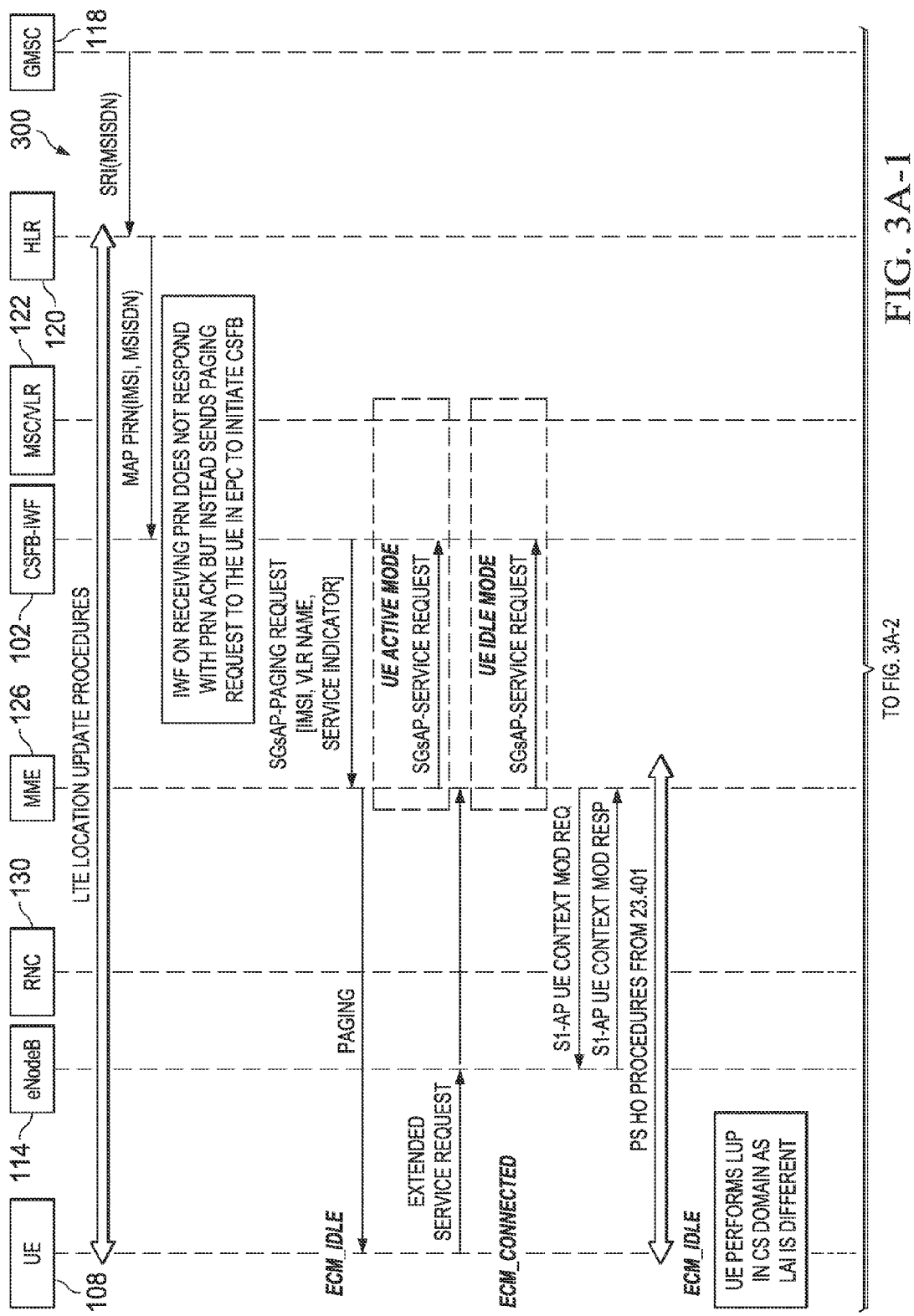
FIGS. 3A and 3B is call flow illustrating circuit switched fallback.
Figures 2, 3B:
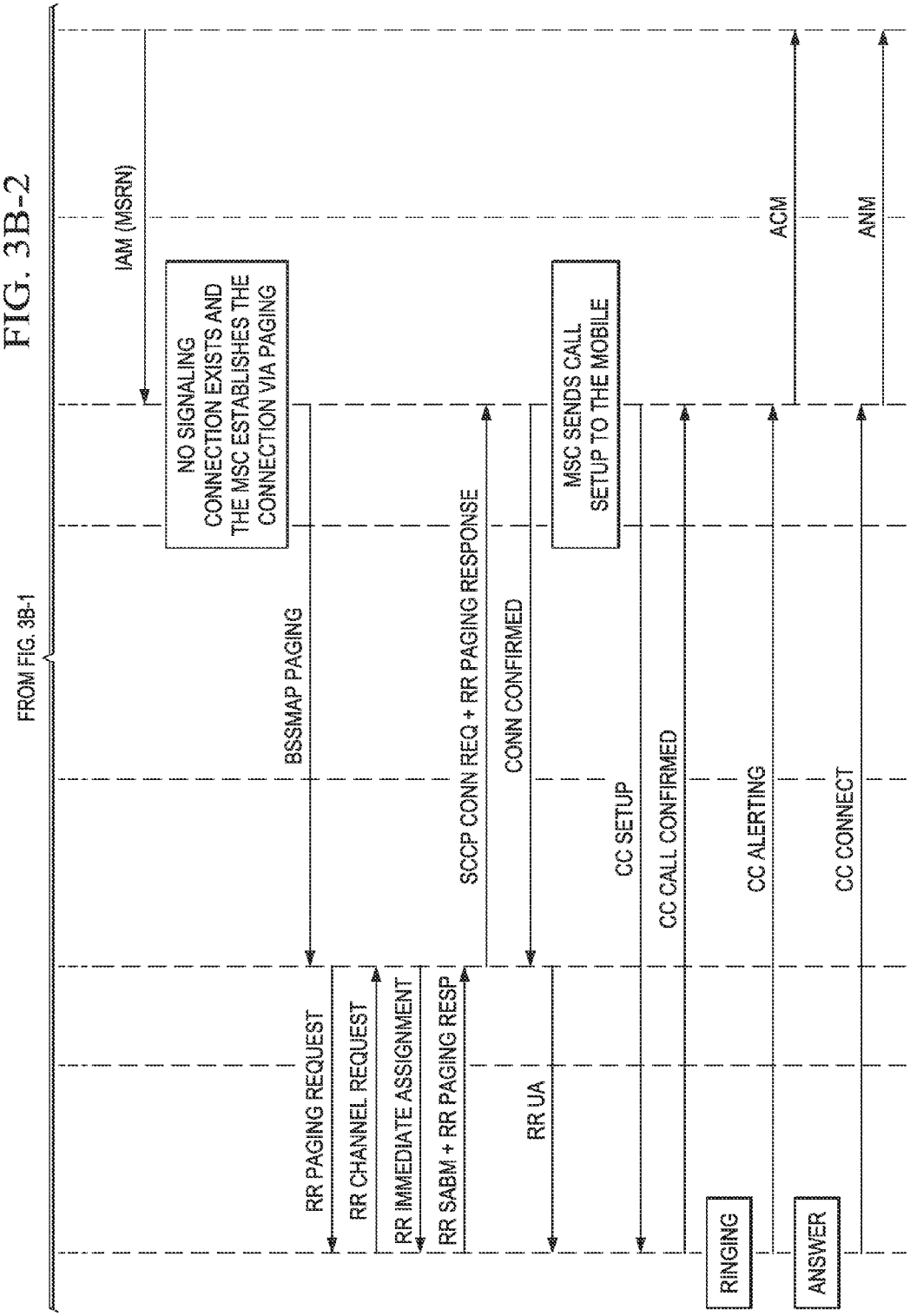

FIGS. 3A and 3B illustrate a call flow 300 for executing a CSFB in accordance with some implementations of the present disclosure. In the call flow 300, the UE 108 initiates the Location Area Update or a Combined RA/LA Update procedure if the LA of the new cell is different from the one stored in the UE 108. The CSFB IWFs are assigned an LAI which is mutually exclusive from the ones used in 2G/3G space which forces the UE 108 to always initiate a Location Area Update. In idle mode, the MME 126 sends Paging request to the eNodeB 114 which in turn sends the request to the UE 108. The MME 126 sends the Service Request to the CSFB IWF 102 after receiving the Extended Service Request from the UE 108. In active mode, the MME 126 sends CS Paging request directly to the UE 108 as it has an established S1 connection. The MME 126 sends the Service Request to the CSFB IWF 102 immediately after sending the Paging Request to the UE 108. In some implementations, the CSFB IWF 02 may set the Service Indicator to "CS Call Indicator" in the SGAP-PAGING-REQUEST message. The CSFB IWF 102 may identify this on receiving MAP PRN message from HLR 120. The CSFB IWF 102 may not include the following attributes in the SGAP-PAGING-REQUEST as these may not be available (e.g., LCS Client Identity, LCS Indicator). The MSC/VLR 122 may not receive a Service Request message from the CSFB IWF 102. 3GPP TS 23.272 says that Service Request message may be used as a trigger to inform the calling party that the call is progressing and to start the CFNRy timer. The CSFB IWF 102 may follow the standard procedures to inform the call progress. Call progress may be triggered per normal procedures once the UE falls back to GERAN/U-TRAN and the call is setup there. Once the CSFB IWF 102 has received a SGsAP-SERVICE-REQUEST from the MME 122, it may send subsequent page retries. The 2G/3G BSC/MSC may not receive a Paging Response from the UE 108 as it always performs a Location Area Update after moving from E-UTRAN 114. The HLR 120 sends the MAP CANCEL LOCATION to the old MSC (CSFB IWF 102 in this case) in parallel to handling the MAP UPDATE LOCATION from new MSC/VLR 122. The CSFB IWF 102 may not wait for the MAP UPDATE LOCATION procedures (which includes one or more MAP INSERT SUBSCRIBER DATA messages) to complete before sending MAP CANCEL LOCATION. The MAP UPDATE LOCATION procedures from the new MSC/VLR 122 at the HLR 120 and the MAP SRI procedures from CSFB IWF 102 may happen in parallel or at least in connection. The CSFB IWF 102 may not be aware of when the new UPDATE LOCATION is completed and may not wait to send MAP SRI to the HLR 120. The trigger for CSFB IWF 102 to send the MAP SRI may be reception of MAP CANCEL LOCATION. The HLR 120 may wait until the MAP UPDATE LOCATION from new MSC/VLR 122 is completed before handling the MAP SRI message from the CSFB IWF 102. Basically the CSFB IWF 102 may wait for the MAP UPDATE LOCATION procedures to complete before sending MAP PRN message to the new MSC/VLR 122. The CSMT flag may not be supported by the 2G/3G MSC/VLR and therefore it may ignore the parameter if received from the UE 108 in the LOCATION UPDATE message. Because of this, the MSC/VLR 122 may release the SCCP connection towards the user after completion of location area update procedures. The HLR may send both IMSI and MSISDN in MAP PRN message towards CSFB IWF 102. The CSFB IWF 102 on receiving an error response for MAP SRI Request may relay the same in the PRN response to the HLR 120 for the initial call. The CSFB IWF 102 may include the Suppress T-CSI parameter in the MAP SRI request sent towards HLR 120. The CSFB IWF 102 may ignore substantially all service indications from the HLR 120 in the MAP SRI response. If inter-RAT handover from E-UTRAN 114 to UMTS/GSM may be supported (i.e., handover of an active packet session), the MME 126 may interact directly with the SGSN as specified in 3GPP TS 23.401. The CSFB IWF 102 may not be involved in these procedures. The CSFB architecture may introduce additional post dial delay compared to a standard CSFB call attempt by invoking a Location Area Update procedure every time the subscriber is moved from E-UTRAN 14 to UTRAN/GERAN. LI for MT calls may be handled at the 2G/3G MSC/VLR 122. In the instances, roaming retry procedures may not be required in this CSFB IWF architecture.

In some implementations, the MME 126 may send SGsAP-PAGING-REJECT message to the CSFB IWF 102 and the corresponding action at CSFB IWF. If the UE 108 is known and is considered to be IMSI attached for EPS services and "SMS only", the MME 126 may return an SGsAP-PAGING-REJECT message indicating in the SGs cause information element "Mobile terminating CS fallback call rejected by the user". The CSFB IWF 102 may send the MAP PRN RESPONSE to HLR 120 with User Error set to "Facility Not Supported". If the UE 108 is known and is marked as IMSI detached for EPS services or IMSI (implicitly or explicitly) detached for non-EPS services, i.e., the state of the SGs association is SGs-NULL, the MME 126 may return an SGsAP-PAGING-REJECT message indicating in the SGs cause information element the detach circumstance ("IMSI detached for EPS services", "IMSI detached for non-EPS services" or "IMSI implicitly detached for non-EPS services"). The CSFB IWF 102 may send the MAP PRN RESPONSE to HLR 120 with User Error set to "Unidentified Subscriber". If the UE 108 is unknown and "MME Reset" is set to "false", the MME 126 may return an SGsAP-PAGING-REJECT message indicating in the SGs cause information element "IMSI unknown. The CSFB IWF 102 may send the MAP PRN RESPONSE to HLR 120 with User Error set to "Unknown Subscriber". If the UE 108 is unknown and "MME Reset" is set to "true" and is considered to be IMSI attached for EPS services and "SMS only", the MME 126 may return an SGsAP-PAGING-REJECT message indicating in the SGs cause information element "Mobile terminating CS fallback call rejected by the user". The CSFB IWF 102 may send the MAP PRN RESPONSE to HLR 20 with User Error set to "Facility Not Supported". The MME 126 may return an SGsAP-UE-UNREACHABLE message indicating in the SGs cause information element "UE unreachable" if the UE 108 is marked as unreachable, as indicated by Paging Proceed Flag set to "false". The CSFB IWF 102 on receiving SGsAP-UE-UNREACHABLE message from MME 126, The CSFB IWF 102 may send the MAP PRN RESPONSE message with User Error set to "no subscriber reply". The CSFB IWF 102 may transition to the appropriate SGs state based on the reject cause in the Paging Reject message. If the UE 108 fails to find the GERAN/UTRAN radio upon the CS fallback attempt, the call attempt may fail. In this scenario, the HLR 120 may time out waiting for the PRN response from CSFB IWF 102.

Figure 4:
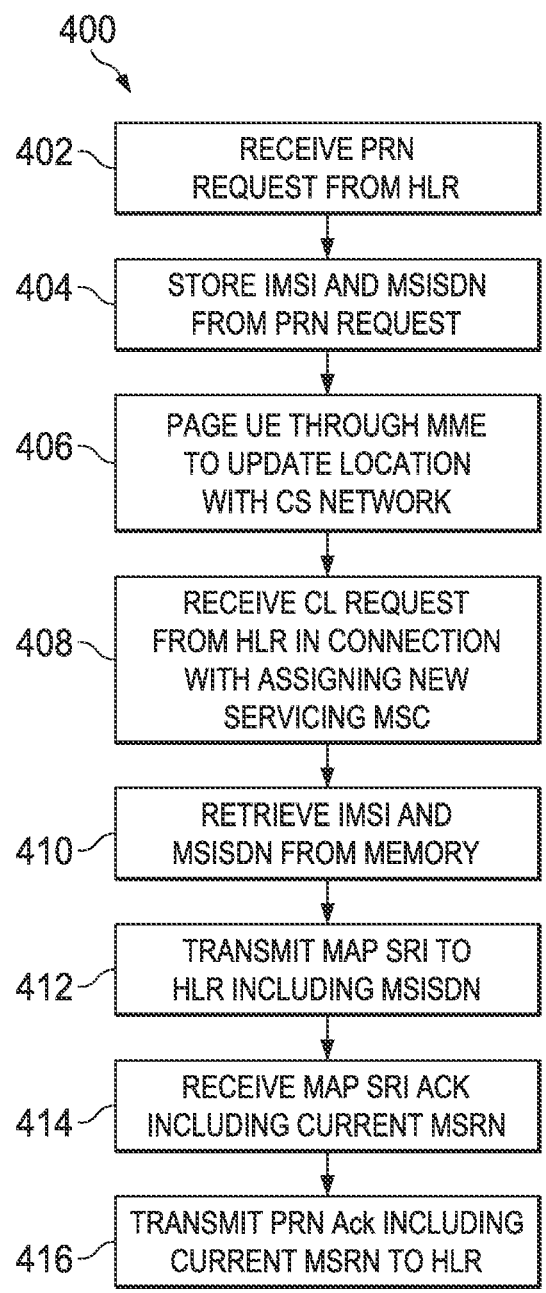
FIG. 4 is a flow chart illustrating example method for executing circuit switched fallback.

FIG. 4 is a flow diagram 400 illustrating an example method for executing a CSFB in accordance with some implementations of the present disclosure.

Method 400 begins at step 402 where a PRN request is received from the HLR. For example, the CSFB IWF 102 in FIG. 1 may receive a PRN request identifying an MSISDN of the UE 108 from the HLR 120. At step 404, the IMSI and the MSIDN identified by the PRN request are stored. In the example, the CSFB IWF 102 may store the IMSI and the MSIDN identified by the PRN request. Next, at step 406, the UE is paged through the MME in an LTE system to update the location through the CS network. As for the example, the CSFB IWF 102 may transmit a page to the MME 126 for the UE 108. In connection with the location update, a cancel location (CL) request is received from the HLR based on assigning a new MSC to the UE at step 408. Again in the example, the HLR 120 may transmit CL request to the CSFB IWF 102 based on the HLR 120 assigning the MSC/VLR 122 to the UE 108. At step 410, the stored MSISDN is retrieved from memory. Turning to the example, the CSFB IWF 102 may retrieve the MSISDN from memory that was identified in the PRN request. Next, at step 412, a MAP SRI request is transmitted to the HLR including the previously-received MSISDN. In the example, the CSFB IWF 102 transmits, to the HLR 120, a MAP SRI request including the MSISDN identified in the PRN request. A MAP SRI Ack identifying the current MSRN of the UE is received at step 414. Next, at step 416, a PRN Ack identifying the current MSRN is transmitted to the HLR. Yet again returning to the example, the CSFB IWF 102 may transmit a PRN Ack including the current MSRN of the UE 108 to the HLR 120 to terminate the call with the UE 108.

A number of embodiments of the invention have been described. Nevertheless, it will be understood that various modifications may be made without departing from the spirit and scope of the invention. Accordingly, other embodiments are within the scope of the following claims.

What is claimed is:

1. A method, comprising:
presenting a network node as a Visited Location Resource (VLR) for User Equipment (UE) to Mobile Management Entity (MME) in a Long Term Evolution (LTE) system, the network node includes an SGs interface to the MME in the LTE system and a MAP interface to a Mobile Switching Center (MSC) in a Cellular System (CS);
receiving, at the MME, a notification of the UE registering the LTE system;
registering, through the MAP interface, with a Home Location Resource (HLR) in the CS as the VLR for the UE;
receiving a request for a routing number for the UE from the CS in connection with a mobile terminating call;
transmitting, through the LTE system, a request for the UE to fall back to CS;
receiving an indication from the HLR that the UE is being served by an MSC/VLR in the CS;
transmitting a request for the routing number for the UE to the MSC/VLR; and
in response to receiving the routing number from the MSC/VLR, transmitting a response to the routing-number request including the received routing number.

2. The method of claim 1, further comprising internetworking between MAP and SGs.

3. The method of claim 1, wherein the network node includes a MAP interface to a Short Message Service Center (SMSC) in the CS system.

4. The method of claim 1, wherein the routing number comprises a Mobile Station Roaming Number (MSRN).

5. The method of claim 1, wherein receiving a request for a routing number comprises receiving a Provide Roaming Number (PRN) identifying a Mobile Subscriber Integrated Services Digital Network Number (MSISDN) from the HLR.

6. The method of claim 1, wherein the request for the UE to fall back to the CS comprises paging the UE through the MME in the LTE system in response to at least the indication that the MSC/VLR is serving the UE.

7. The method of claim 1, wherein the request for an MSRN to MSC/VLR comprises a Send Routing Information (SRI) request to the HLR.

8. The method of claim 1, wherein transmitting a response to the request for the routing number comprises transmitting a PRN Acknowledgement (Ack) identifying the routing number.

9. A network node, comprising:
an SGs interface to an MME in a LTE system;
a MAP interface to an MSC in a CS; and one or more processors operable to:
present a network node as a VLR for UE to the MME in the LTE system;
receive a notification of the UE registering the LTE system from the MME;
register, through the MAP interface, with an HLR in the CS as a servicing VLR for the UE;
receive a request for a routing number for the UE from the CS in connection with a mobile terminating call;
transmit, through the LTE system, a request for the UE to fallback to CS;
receive an indication from the HLR that the UE is being served by an MSC/VLR in the CS;
transmit a request for the routing number for the UE from the MSC/VLR; and
in response to receiving the routing number from the MSC/VLR, transmit a response to the routing-number request including the receiving routing number.

10. The network node of claim 9, the processors further operable to internetwork between MAP and SGs.

11. The network node of claim 9, wherein the network node includes a MAP interface to a SMSC in the CS system.

12. The network node of claim 9, wherein the routing number comprises a MSRN.

13. The network node of claim 9, wherein the processors operable to receive a request for a routing number comprises the processors operable to receive a PRN identifying an MSISDN from the HLR.

14. The network node of claim 9, wherein the processors operable to transmit the request for the UE to fall back to the CS comprises the processors operable to page the UE through the MME in the LTE system in response to at least the indication that the MSC/VLR is serving the UE.

15. The network node of claim 9, wherein the request for an MSRN to MSC/VLR comprises an SRI request to the HLR.

16. The network node of claim 9, wherein the processors operable to transmit a response to the request for the routing number comprises the processors operable to transmit a PRN Ack identifying the routing number.

17. A non-transitory computer-readable medium having encoded thereon a method presenting a Visited Location Resource (VLR) for User Equipment (UE) to Mobile Management Entity (MME), comprising:

receiving, through an SGs interface at the MME, a notification of the UE registering with the LTE system;

registering, through a MAP interface, with a Home Location Resource (HLR) in a Cellular System as the VLR for the UE in response to the notification;

receiving a request for a routing number for the UE from the CS in connection with a mobile terminating call;

transmitting, through the LTE system, a request for the UE to fall back to CS;

receiving an indication from the HLR that the UE is being served by an MSC/VLR in the CS;

transmitting a request for the routing number for the UE to the MSC/VLR; and in response to receiving the routing number from the MSC/VLR, transmitting a response to the routing-number request including the received routing number.

* * * * *